(12) United States Patent
Karame et al.

(10) Patent No.: US 10,313,120 B2
(45) Date of Patent: Jun. 4, 2019

(54) METHOD FOR STORING DATA IN A RELATIONAL DATABASE AND RELATIONAL DATABASE SERVER

(71) Applicant: NEC Europe Ltd., Heidelberg (DE)

(72) Inventors: Ghassan Karame, Heidelberg (DE); Jens-Matthias Bohli, Leimen (DE); Sebstian Gajek, Flensburg (DE)

(73) Assignee: NEC CORPORATION, Tokyo (JP)

( * ) Notice: Subject to any disclaimer, the term of this patent is extended or adjusted under 35 U.S.C. 154(b) by 668 days.

(21) Appl. No.: 14/402,176

(22) PCT Filed: Dec. 6, 2012

(86) PCT No.: PCT/EP2012/074675
§ 371 (c)(1),
(2) Date: Nov. 19, 2014

(87) PCT Pub. No.: WO2013/174457
PCT Pub. Date: Nov. 28, 2013

(65) Prior Publication Data
US 2015/0106632 A1    Apr. 16, 2015

(30) Foreign Application Priority Data

May 24, 2012   (EP) .................................... 12169208

(51) Int. Cl.
*H04L 9/08*    (2006.01)
*G06F 16/28*   (2019.01)

(52) U.S. Cl.
CPC .......... *H04L 9/0894* (2013.01); *G06F 16/284* (2019.01); *H04L 2209/38* (2013.01)

(58) Field of Classification Search
USPC ......................................................... 713/193
See application file for complete search history.

(56) References Cited

U.S. PATENT DOCUMENTS

| | | | | |
|---|---|---|---|---|
| 7,743,069 B2 * | 6/2010 | Chitkara | ........... | G06F 17/30595 707/781 |
| 7,797,342 B2 * | 9/2010 | Banks | ............... | G06F 17/30595 707/783 |
| 7,827,403 B2 * | 11/2010 | Wong | .................. | G06F 21/6227 380/282 |
| 8,504,844 B2 * | 8/2013 | Browning | ......... | G06F 17/30286 713/189 |
| 8,769,302 B2 * | 7/2014 | Mittelstadt | .......... | G06F 21/6227 713/189 |

(Continued)

*Primary Examiner* — Khalil Naghdali
(74) *Attorney, Agent, or Firm* — Leydig, Voit & Mayer, Ltd.

(57) ABSTRACT

The invention relates to a method for storing data in a relational database, comprising a plurality of tables, wherein the data is stored in these tables, wherein each row of each table is provided with an original primary key for identification, and wherein foreign keys are provided for cross-referencing different tables of the relational database, wherein the primary keys are encrypted, wherein the foreign keys are encrypted based on the encrypted primary keys and wherein for each table where a primary key is referenced as a foreign key an encrypted pointer is stored to link the corresponding encrypted foreign key to the encrypted primary key. The present invention further relates to a relational database server.

11 Claims, 2 Drawing Sheets

(56) References Cited

U.S. PATENT DOCUMENTS

Figure 1:
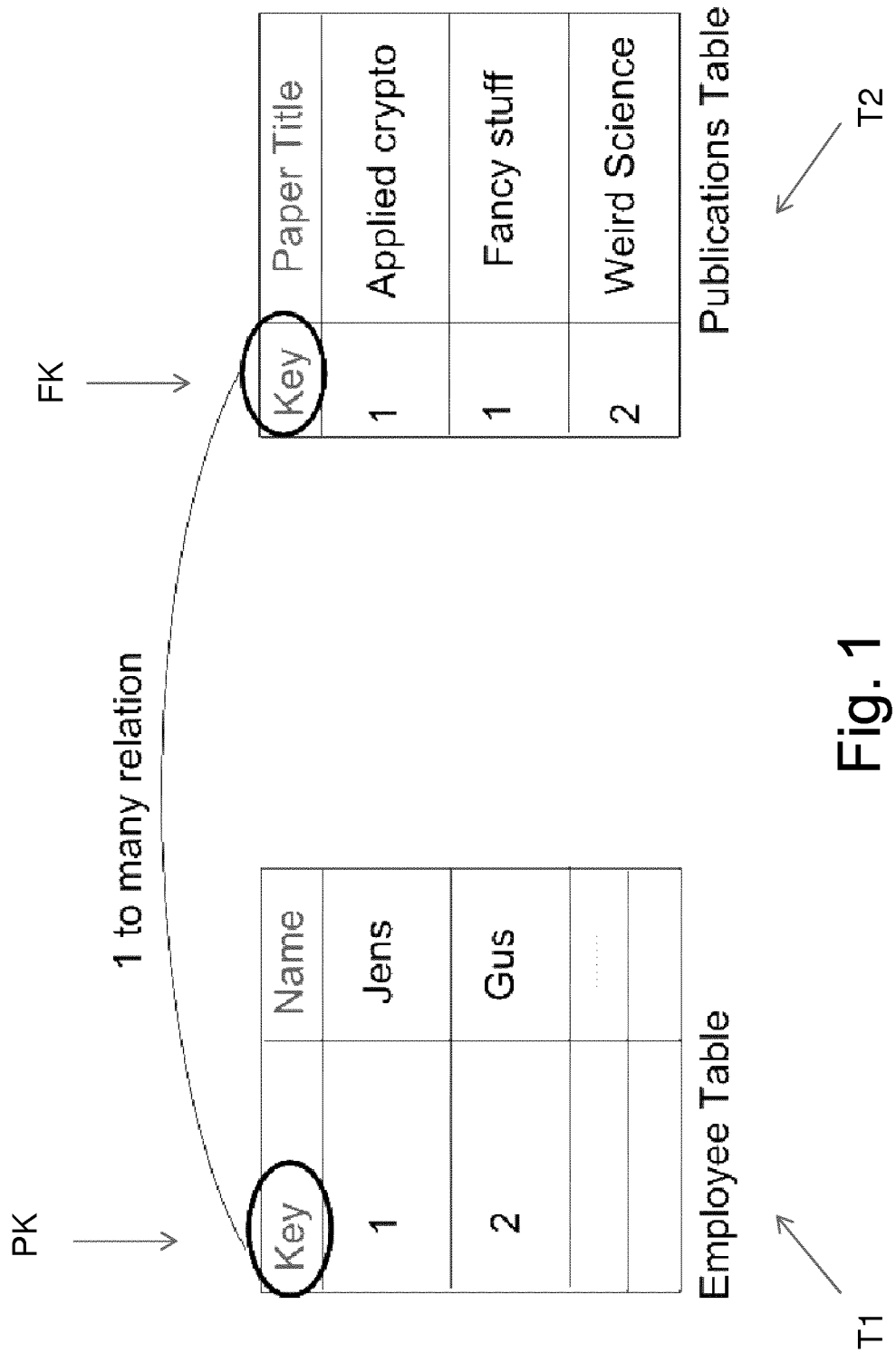

| | | | |
|---|---|---|---|
| 9,129,089 B2* | 9/2015 | DiAcetis | ........... G06F 21/10 |
| 2004/0243816 A1 | 12/2004 | Hacigumus et al. | |
| 2010/0142710 A1 | 6/2010 | Chrysler et al. | |

* cited by examiner

METHOD FOR STORING DATA IN A RELATIONAL DATABASE AND RELATIONAL DATABASE SERVER

The present invention relates to a method for storing data in a relational database, comprising a plurality of tables, wherein the data is stored in these tables, wherein each row of each table is provided with an original primary key for identification and wherein foreign keys are provided for cross-referencing different tables of the relational database.

The present invention further relates to a relational database server for storing data, preferably for performing with a method to one of the claims 1-9, wherein the relational database server is configured to provide a plurality of tables to store the data in these tables, to provide each row of each table with an original primary key for identification and to provide foreign keys for cross-referencing different tables.

Protecting confidentiality in databases is receiving nowadays increasing importance. This means that not only the data in the database is protected but also the structure of the data such as relations between data in different tables of a relational database. To protect confidentiality of one the conventional approaches is to encrypt the entire database contents. If the encryption is performed with a probabilistic encryption algorithm then static leakage of information can be prevented. However, one significant drawback of encrypting the entire database is, that this leads to a severe deterioration in the performance of the database.

Another conventional approach is to use a weaker form of encryption for the database contents such as deterministic encryption. These guarantees some (limited) confidentiality of the data in the database. However, deterministic encryption does not hide the data dependencies such as relations between entries in tables of a relational database. For example an adversary infers relations between data content and might learn some information about the encrypted data.

In the non-patent literature of Raluca Ada Popa, Cahterine M. S. Redfield, Nickolai Zeldovich, and Hari Balakrishnan: "CryptDB: Protecting Confidentiality with Encrypted Query Processing", In Proceedings of the 23$^{rd}$ ACM Symposium on Operating Systems Principles (SOSP 2011), Cascais, Portugal, October 2011, of Hakan Hacigümüs, Bala Iyer, Chen Li and Shard Mehrotra: "Executing SQL over encrypted data in the database-service-provider model", In Proceedings of SIGMOD; 2002 and of Erez Shmueli, Ronen Waisenberg, Yuval Elovici, Ehud Gudes: "Designing Secure Indexes for Encrypted Databases", In Data and Applications Security XIX, Vol. 3654 (2005), pp. 925-925, doi: 10.100711535706_5 foreign and primary keys are treated in the same way as other data fields in the relational data base. However, in terms of performance it needs O(n) decryptions to find all foreign keys corresponding to a given primary key and O(n) decryptions to find the primary key that corresponds to a given foreign key. Here n refers to a number of entries in a given tables.

It is therefore an objective of the present invention to provide a method for storing data in a relational database and a relational database server which are efficient and at the same time secure to prevent an adversary from gaining any meaningful information of the data of the relational database.

The aforementioned objectives are accomplished by a method of claim 1 and a relational database server according to claim 10.

According to claim 1 a method for storing data in a relational data base comprises a plurality of tables, wherein the data is stored in these tables, wherein each row of each table is provided with an original primary key for identification and wherein foreign keys are provided for cross-referencing different tables of the relational database.

The method according to claim 1 is characterized in that the primary keys are encrypted, that the foreign keys are encrypted based on the encrypted primary keys and that for each table where primary keys referenced as a foreign key an encrypted pointer is stored to link the corresponding encrypted foreign key to the encrypted primary key.

According to claim 10 the relational database server for storing data, preferably for performing with a method according to one of the claims 1-9 is configured to provide a plurality of tables to store the data in these tables, to provide each row of teach table with an original primary key for identification and to provide foreign keys for cross-referencing different tables.

According to claim 10 the relational data base server is characterized in that the relational database server is configured to encrypt the primary keys, to encrypt the foreign keys based on the encrypted primary keys and store an encrypted pointer to link the corresponding encrypted foreign key to the encrypted primary key for each table, where the primary key is referenced as a foreign key.

According to the invention it has been recognized that static leakage of information is prevented although a linking between elements in different tables is supported.

According to the invention it has further been recognized that an efficient query linking between primary keys and all corresponding foreign keys between tables is provided.

According to the invention it has been further recognized that an efficient query linking between each foreign key and its corresponding primary key is provided.

According to the invention it has been further recognized that functionality of the relational database is maintained in spite of encryption of both primary and foreign keys.

According to the invention it has further been recognized that relations between different tables is protected.

According to the invention it has further been recognized that in contrast to conventional proposals or approaches either keeping the foreign keys as plaintext or in contrast treat these entries the same as other data entries in the database lightweight encryption techniques to encrypt entries in the relational database ensure sufficient security and fully support functionality of the relational database.

According to the invention it has further been recognized that the performance of encrypted databases is significantly boosted without compromising the security against passive adversaries. Compared with performance of the methods in the aforementioned non-patent literature, it takes O(m) with m<<n being the number of foreign keys per table that refer to the same primary key to find all foreign keys corresponding to a given primary key and O(1) decryptions to find the primary key that corresponds to a given foreign key which results in an increased performance when querying the relational database.

Further features, advantages and preferred embodiments are described in the following subclaims.

According to a preferred embodiment the primary keys and/or the foreign keys are encrypted by symmetric encryption, preferably AES. When using symmetric encryption for the primary keys and/or the foreign keys a lightweight encryption may be used reducing encryption and decryption time while providing a sufficient confidentiality of the data stored in the database.

According to a further preferred embodiment multiple occurrences of foreign keys in the same table are linked consecutively based on at least a prior occurrence. This ensures that the operation of finding of foreign keys in a table corresponding to a given primary key can be performed very efficiently due to consecutively linking.

According to a further preferred embodiment for the first occurrence of a foreign key in a table this foreign key is generated by encrypting a corresponding encrypted primary key and a value for table identification. This enables a simple and efficient provision of the first occurrence i.e. entry of a foreign key.

According to a further preferred embodiment pointers are encrypted with an encryption key different from the encryption key for encrypting the primary keys and/or foreign keys. This further enhances the security, since different encryption keys are used for pointers and/or primary keys and/or foreign keys.

According to a further preferred embodiment a control table is generated, preferably encrypted. A control table provides the advantage of managing addition or deletion of entries in the relational database efficiently. The control table may contain the indexes of the elements that were deleted or added from or to the corresponding table.

According to a further preferred embodiment at least one of the encryption keys for encrypting the primary keys and/or the pointers is stored outside the relational database. This further enhances the security since at least one of the encryption keys is only known to an external trusted entity.

According to a further preferred embodiment the encrypted foreign keys are stored in form of a linked list starting from the foreign key that links to the primary key. This provides a simple, secure and efficient indexing scheme that links foreign keys to the primary keys. A further advantage is that this linked list resists static leakage but its elements can be fetched and encrypted efficiently without the need for a constant interaction for example with the aforementioned trusted entity storing the master encryption key.

According to a further preferred embodiment the primary keys are provided in form of extra identifiers, preferably generated by the relational database itself. This enables primary keys to be generated in a simple and very efficient way.

According to a further preferred embodiment of the relational database server according to claim 10 the relational database server is connected to an encryption server, wherein the encryption server is configured to provide encryption keys for encrypting the primary keys and/or the pointers. This further enhances the security since at least one of the encryption keys is only known to an external trusted entity, i.e. the encryption server.

There are several ways how to design and further develop the teaching of the present invention in an advantageous way. To this end it is to be referred to the patent claims subordinate to patent claim 1 and patent claim 10 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawings FIG. 1 shows in a schematic view a conventional method for storing data in a relational database; and FIG. 2 shows a method according to an embodiment of the present invention.

FIG. 1 shows in a schematic view a conventional method for storing data in a relational database.

In FIG. 1 a plaintext relational database, i.e. before encryption, is shown. An employee table T1 comprising an identification key PK and corresponding data in form of names is provided. This employee table T1 is linked with a publication table T2 via a one-to-many relation. In the publication table T2 the primary key appears as a foreign key and links with data in form of the paper title to the foreign key. The foreign key entries are redundant in the sense that they are an exact duplicate of the primary key and that they are solely included in the table to associate different rows/entries between two or more tables T1, T2.

Figure 2:
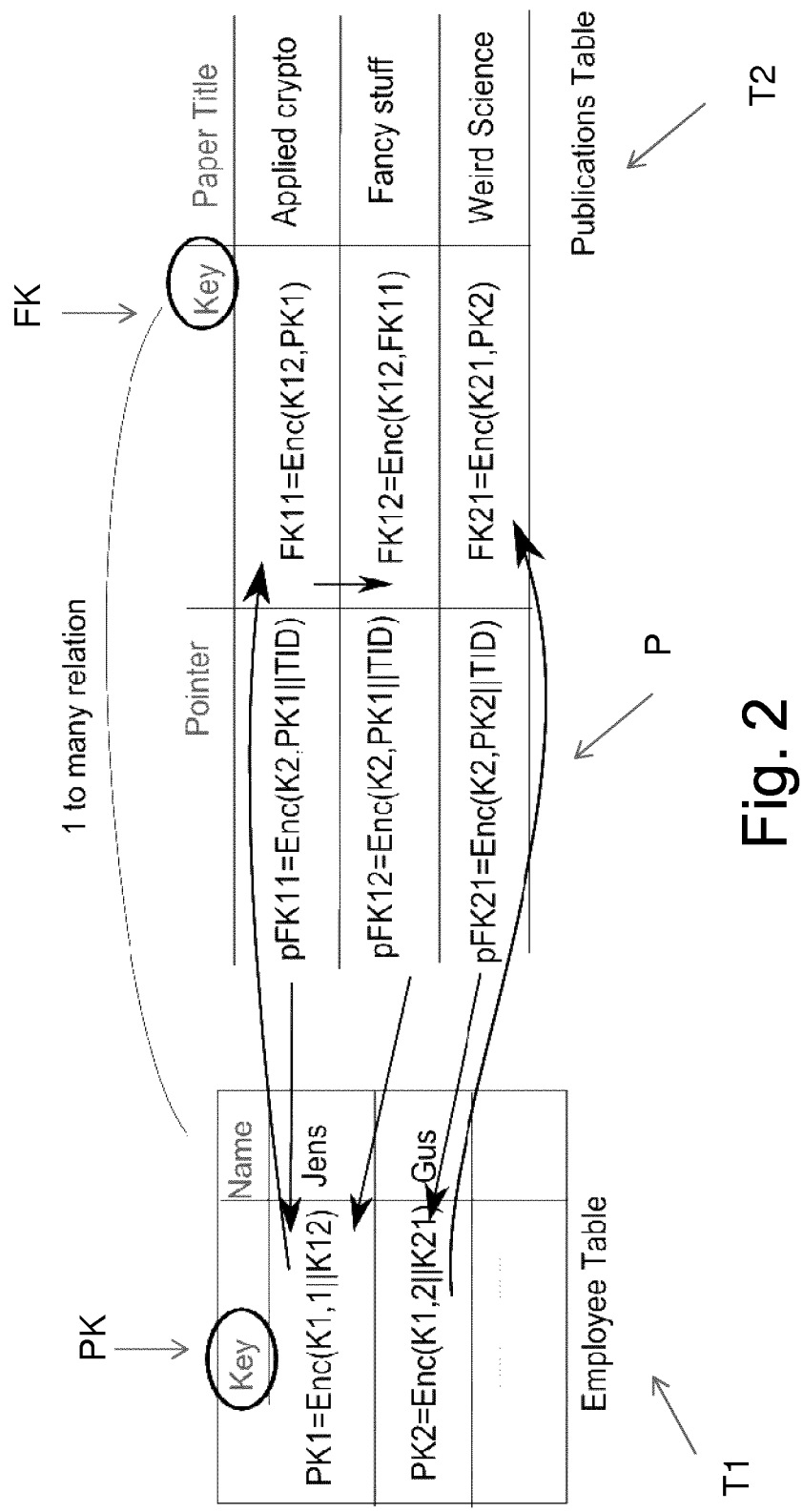

FIG. 2 shows a method according to an embodiment of the present invention.

In FIG. 2 an example of a relational data base is shown comprising two tables T1, T2. There is a one-to-many relationship between the employee table T1 and the publication table T2. In the following it is assumed that the entries labeled "name" and "paper title" are encrypted using a scheme ensuring semantic security and enabling efficient processing of these fields.

In FIG. 2 a trusted proxy (not shown) possesses master keys K1 and K2. The master keys K1 and K2 are symmetric keys of a symmetric semantically secure encryption key, for example AES or the like. In the following it is assumed that primary keys are chosen at random. Further in the following $OPK_j$ denotes the original primary key in row i of table j. $PK_i$ denotes the transformed, i.e. encrypted primary key: $PK_i=Enc_{K1}(OPK_i\|K_{i1})$. The abbreviation Enc denotes a semantically secure symmetric encryption algorithm and $\|$ denote concatenation and $K_{i1}$ is a randomly generated fresh key.

When the encrypted primary key $PK_i$ is first referenced in the other table T2 it will take the value $FK_{in}=Enc_{Ki1}(PKi\|TID)$. Here TID references the corresponding table ID. As more occurrences of $PK_i$, i.e. the encrypted primary key occur in the same table, a chain starting from $FK_{i1}$ is generated as follows: $FK_{in}=Enc_{Ki1}(FK_{in-1})$, for n>1.

In each table where the primary key PK is referenced as a foreign key FK a pointer column with pointers P is added. This pointer column comprises encrypted entries that link to the original primary key $OPK_i$ in the table where it appears. All pointers pointing to the encrypted primary key $PK_i$ are constructed as follows: $pFKij=Enc_{K2}(PK_i\|TID)$. This provides an indexing scheme linking foreign keys FK to the primary keys PK. In FIG. 2 only two tables T1 and T2 are shown. However, for more tables multiple linked lists are provided that all start from the primary key PK and link all the consecutive entries per table where this primary key PK is referenced in a separate linked list. Further the primary key can be acquired directly from each foreign key in one simple decryption owing to the use of the encrypted pointers P.

In FIG. 2 this embodiment uses only two tables. Of course the present invention is not limited to two tables only but may be used also more than two tables for example ten or twenty tables.

In summary the present invention enables encrypting of foreign keys in a table of relational database so that the relation between the tables is protected in such a way that for a query to the relational database requiring an operation on both tables, a key can be revealed decrypting exactly the information that is needed to answer the query but not more.

Further the present invention provides an oblivious linked list that is placed in the column of the corresponding foreign table. Even further the present invention links a foreign key column in a table with an encrypted pointer to the primary key in a target table.

The present invention further enables relations between tables to be encrypted on a relational database server. The relational database server can follow exactly those links needed to answer a query but cannot gain more knowledge than required for the specific query. The present invention provides an intact functionality of the relational database and an overhead in accessing encrypted records or entries is minimized.

One of the advantages of the present invention is that foreign keys are encrypted differently from the remaining entries in the relational database. This enables the use of lightweight encryption techniques to encrypt these entries while fully supporting existing functionality of the relational database. The present invention further provides significantly a boost in the performance of encrypted relational databases without compromising a security against passive adversaries.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for storing data in a relational database, comprising:
    a plurality of tables, wherein the data is stored in these tables, wherein each row of each table is provided with an original primary key for identification, and wherein foreign keys are provided for cross-referencing different tables of the relational database,
    wherein the primary keys are encrypted, that the foreign keys are encrypted based on the encrypted primary keys and that for each table where a primary key is referenced as a foreign key an encrypted pointer is stored to link the corresponding encrypted foreign key to the encrypted primary key.

2. The method according to claim 1, wherein the primary keys and/or the foreign keys are encrypted by symmetric encryption.

3. The method according to claim 1, wherein multiple occurrences of foreign keys in the same table are linked consecutively based on at least a prior occurrence.

4. The method according to claim 3, wherein for the first occurrence of a foreign key in a table this foreign key is generated by encrypting the corresponding encrypted primary key and a value for table identification.

5. The method according to claim 1, wherein pointers are encrypted with an encryption key different from an encryption key for encrypting the primary keys and/or foreign keys.

6. The method according to claim 1, wherein a control table is generated.

7. The method according to claim 1, wherein at least one encryption key for encrypting the primary keys and/or the pointers is stored outside the relational database.

8. The method according to claim 1, wherein the encrypted foreign keys are stored in form of a linked list starting from the foreign key that links to the primary key.

9. The method according to claim 1, wherein the primary keys are provided in a form of extra identifiers.

10. A relational database server for storing data, the relational database comprising a server configured to provide a plurality of tables, to store the data in these tables, to provide each row of each table with an original primary key for identification, and to provide foreign keys for cross-referencing different tables, wherein the relational database server is configured to encrypt the primary keys, to encrypt the foreign keys based on the encrypted primary keys and to store an encrypted pointer to link the corresponding encrypted foreign key to the encrypted primary key for each table where a primary key is referenced as a foreign key.

11. The relational database server according to claim 10, wherein the relational database server is connected to a encryption server, wherein the encryption server is configured to provide encryption keys for encrypting the primary keys and/or the pointers.

* * * * *